US011783253B1

(12) United States Patent
Pelz et al.

(10) Patent No.: US 11,783,253 B1
(45) Date of Patent: Oct. 10, 2023

(54) SYSTEMS AND METHODS TO EFFECTUATE SETS OF AUTOMATED ACTIONS OUTSIDE AND/OR WITHIN A COLLABORATION ENVIRONMENT BASED ON TRIGGER EVENTS OCCURRING OUTSIDE AND/OR WITHIN THE COLLABORATION ENVIRONMENT

(71) Applicant: Asana, Inc., San Francisco, CA (US)

(72) Inventors: Eric Seth Pelz, San Francisco, CA (US); Micah Hanan Fenner, San Francisco, CA (US); Abigail Lorean Kelly, San Francisco, CA (US); Cvetomir I. Cankov, Oakland, CA (US); Alexander Thomas Ryan, San Francisco, CA (US); Adrian Van Yen, Saratoga, CA (US); John Wesley Graham, San Francisco, CA (US); Anna Marie Clifton, San Francisco, CA (US); Lili Jiang Rachowin, San Francisco, CA (US); Sika Gasinu, Berkeley, CA (US)

(73) Assignee: Asana, Inc., San Francisco, CA (US)

( * ) Notice: Subject to any disclaimer, the term of this patent is extended or adjusted under 35 U.S.C. 154(b) by 42 days.

(21) Appl. No.: 16/787,400

(22) Filed: Feb. 11, 2020

(51) Int. Cl.
*G06Q 10/0631* (2023.01)

(52) U.S. Cl.
CPC . *G06Q 10/06316* (2013.01); *G06Q 10/06313* (2013.01)

(58) Field of Classification Search
CPC .................. G06Q 10/06316; G06Q 10/06313
See application file for complete search history.

(56) References Cited

U.S. PATENT DOCUMENTS

| 5,233,687 A | 8/1993 | Henderson, Jr. |
| 5,524,077 A | 6/1996 | Faaland |

(Continued)

FOREIGN PATENT DOCUMENTS

| CN | 101305350 A | 11/2008 |
| CN | 101563671 A | 10/2009 |

(Continued)

OTHER PUBLICATIONS

Sheth, A., Kochut, K.J., Workflow Applications to Research Agenda: Scalable and Dynamic Work Coordination and Collaboration Systems. In: Doğaç, A., Kalinichenko, L., Özsu, M.T., Sheth, A. (eds) Workflow Management Systems and Interoperability. NATO ASI Series, vol. 164. (Year: 1998).*

(Continued)

*Primary Examiner* — Andre D Boyce
(74) *Attorney, Agent, or Firm* — ESPLIN & ASSOCIATES, PC

(57) ABSTRACT

Systems and methods for effectuating sets of automated actions within and/or outside a collaboration environment based on trigger events occurring within and/or outside the collaboration environment are disclosed. Exemplary implementations may: manage environment state information maintaining a collaboration environment, the collaboration environment being configured to facilitate interaction by users with the collaboration environment, the environment state information including values of environment parameters; generate automation information based on user entry and/or selection of the automation information into a user interface, the automation information specifying sets of automated actions to carry out outside the collaboration environment in response to occurrence of trigger events occurring within the collaboration environment; detect occurrence of the trigger events based on changes in the (Continued)

values of the environment parameters; responsive to the detection of the occurrence of individual trigger events, effectuate individual sets of automated actions outside the collaboration environment; and/or perform other operations.

20 Claims, 5 Drawing Sheets

(56) References Cited

U.S. PATENT DOCUMENTS

| | | |
|---|---|---|
| 5,530,861 A | 6/1996 | Diamant |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,053 B2 | 8/2010 | Beck |
| 7,805,327 B1 | 9/2010 | Schulz |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,491,249 B2 | 11/2016 | Rosenshine |
| 9,514,424 B2 | 12/2016 | Kleinbart |
| 9,565,246 B1 * | 2/2017 | Tsypliaev ............ G06Q 10/107 |
| 9,600,136 B1 | 3/2017 | Yang |
| 9,712,576 B1 | 7/2017 | Gill |
| 9,785,445 B2 | 10/2017 | Mitsui |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097410 A1 | 5/2003 | Atkins |
| 2003/0126001 A1 | 7/2003 | Northcutt |
| 2003/0225598 A1 | 12/2003 | Yu |
| 2003/0233265 A1 | 12/2003 | Lee |
| 2003/0233268 A1 | 12/2003 | Taqbeem |
| 2004/0030992 A1 | 2/2004 | Moisa |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Booking |
| 2006/0136441 A1 | 6/2006 | Fujisaki |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |

(56) References Cited

U.S. PATENT DOCUMENTS

| | | |
|---|---|---|
| 2007/0232278 A1 | 10/2007 | May |
| 2007/0245300 A1 | 10/2007 | Chan |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0005235 A1 | 1/2008 | Hegde |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0120129 A1 | 5/2008 | Seubert |
| 2008/0126930 A1 | 5/2008 | Scott |
| 2008/0126945 A1 | 5/2008 | Munkvold |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313595 A1 | 12/2008 | Boulineau |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2010/0005087 A1 | 1/2010 | Basco |
| 2010/0063860 A1 | 3/2010 | Gallion |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1* | 5/2010 | Stanzione ............... H04L 65/40 713/150 |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0107333 A1 | 5/2011 | Kapoor |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0018952 A1 | 1/2013 | Mcconnell |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1* | 10/2013 | Moganti ............... G06F 16/20 705/14.66 |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Boni |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1* | 8/2014 | Smith ............... G06Q 10/0633 |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |

(56) References Cited

U.S. PATENT DOCUMENTS

| | | |
|---|---|---|
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1* | 2/2016 | Madhu ............... H04L 47/783 718/1 |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | Mcclement |
| 2016/0182311 A1 | 6/2016 | Borna |
| 2016/0188145 A1 | 6/2016 | Vida |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0223069 A1 | 8/2017 | Arora |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0344931 A1 | 11/2017 | Shenk |
| 2017/0346861 A1* | 11/2017 | Pearl ................. H04L 67/10 |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0109421 A1 | 4/2018 | Laribi |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367483 A1 | 12/2018 | Rodriguez |
| 2018/0373804 A1 | 12/2018 | Zhang |
| 2019/0005048 A1 | 1/2019 | Crivello |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1* | 5/2020 | Siddiqi ............... H04L 41/22 |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0233879 A1 | 7/2020 | Papanicolaou |
| 2020/0328906 A1 | 10/2020 | Raghavan |
| 2020/0344253 A1 | 10/2020 | Kurup |
| 2020/0358628 A1 | 11/2020 | Achyuth |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0207489 A1 | 6/2022 | Gupta |
| 2022/0239516 A1 | 7/2022 | Iyer |

(56) References Cited

U.S. PATENT DOCUMENTS

FOREIGN PATENT DOCUMENTS

| CN | 101339642 B | 12/2011 |
|---|---|---|
| CN | 102378975 B | 5/2015 |
| WO | 2015036817 A1 | 3/2015 |
| WO | 2015123751 A1 | 8/2015 |
| WO | 2016033493 A1 | 3/2016 |
| WO | 2020006634 A1 | 1/2020 |

OTHER PUBLICATIONS

Ghiani et al, Personalization of Context-Dependent Applications Through Trigger-Action Rules, ACM Transactions on Computer-Human Interaction vol. 24 Issue 2 Article No. 14 pp. 1-33 (Year: 2017).*

Hartmann, "TimeProjectscheduling with resource capacities and requests varying with time: a case study," 2013, Flexible services and manufacturing journal, vol. 25, No. 1, pp. 74-93 (Year: 2013).

Paul Minors, How to automate your tasks, youtube excerpts, Oct. 18, 2019 https://www.youtube.com/watch?v=lwF9XyUQrzw (Year: 2019).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

www.asana.com (as retrieved from https://web.archive.Org/web/20160101054536/https://asana.com/press and https://web.archive.org/web/20160101054527/https://asana.com/product) (Year: 2016) 15 pages.

"U.S. Appl. No. 14/584,750, Examiner Interview Summary dated Feb. 25, 2016", 3 pgs.

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. 14/584,850, Response filed Apr. 10, 2017 to Non Final Office Action dated Jan. 10, 2017", 13 pgs.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA&list=PLJFG93oi0wJAi UwyOhlGWHdtJzJrzylBv (Year: 2019) (1 page).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resource s/infosheets/where-does-asana-fit (Year: 2017) (5 pages).

www.cogmotive.com/blog/author/alan Alan Byrne: "Creating a company Shared Calendar in Office 365"; pp. 1-17; Sep. 10, 2013.

Assef, F., Cassius, T. S., & Maria, T. S. (2018). Confrontation between techniques of time measurement. Journal of Manufacturing Technology Management, 29(5), 789-810. (Year: 2018).

(Tiburca, Andrew) Best Team Calendar Applications for 2018-Toggl https://toggl.com/blog/best-team-calendar-applications-for-2018 (Year: 2017).

"How to Asana: Inviting teammates to Asana." YouTube, Asana, Mar. 21, 2017, https://www.youtube.com/watch?v=TLOruY1KyxU (Year: 2017), 13 pages.

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, Wikipedia, archives org Feb. 11, 2020 http://web.archive.org/web/20200211082902/https://en.wikipedia.org/wiki/Macro_(computer_science) (Year: 2020).

Command and control, Wikipedia, archives org, Mar. 16, 2018 https://web.archive.org/web/20180316193655/https://en.wikipedia.org/wiki/Command_and_control (Year: 2018), 6 pages.

(56) References Cited

OTHER PUBLICATIONS

Dawei Li, "Deepcham: Collaborative Edge-Mediated Adaptive Deep Learning for Mobile Object Recognition", 2016, IEEE/ACM, pp. 64-76. (Year: 2016).

Peter Wurman, "Coordinating Hundreds of Cooperative, Autonomous Vehicles in Warehouses," 2008, AI Magazine, vol. 29, No. 1, pp. 9-19. (Year: 2008).

Sara Perez-Soler, "Towards Conversational Syntax for Domain-Specific Languages using Chatbots", 2019, Journal of Object Technology, vol. 18, No. 2, pp. 5:1-21. (Year: 2019).

\* cited by examiner

SYSTEMS AND METHODS TO EFFECTUATE SETS OF AUTOMATED ACTIONS OUTSIDE AND/OR WITHIN A COLLABORATION ENVIRONMENT BASED ON TRIGGER EVENTS OCCURRING OUTSIDE AND/OR WITHIN THE COLLABORATION ENVIRONMENT

FIELD OF THE DISCLOSURE

The present disclosure relates to systems and methods to effectuate sets of automated actions outside and/or within a collaboration environment based on trigger events occurring outside and/or within the collaboration environment.

BACKGROUND

Collaboration environments, sometimes referred to as integrated collaboration environments, may enable users to assign projects, tasks, or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, and/or instant message into a single easy-to-use, intuitive interface.

SUMMARY

One aspect of the present disclosure relates to a system configured to effectuate sets of automated actions outside a collaboration environment based on trigger events occurring within the collaboration environment. Another aspect of the present disclosure relates to a system configured to effectuate sets of automated actions within a collaboration environment based on trigger events occurring outside the collaboration environment. Yet another aspect of the present disclosure relates to a system configured to effectuate sets of automated actions outside a collaboration environment based on trigger events occurring outside the collaboration environment.

Collaboration environments may require users to manually interact within the collaboration environment and/or applications/services outside of the collaboration environment in response to actions of other users and/or other events occurring within the collaboration environment. The responsive interactions outside the collaboration environment may include, for example, calendaring events into a personal calendar application, drafted and/or sending emails, sending personal messages over a messaging application and/or service separate from the collaboration environment, effectuating electronic payments, and/or other interactions. Over time, the users may tend to follow patterns with how they react to certain events and/or actions within the collaboration environment. This may create a negative experience for users who may tire of the potentially repetitive work. Requiring such repetitive manual interaction may increase friction within and/or outside of the collaboration environment. One or more implementations of the systems and methods presented herein may create less friction and/or more efficient use of the collaboration environment and one or more applications and/or services outside the collaboration environment by effectuating automatic sequences of actions outside the collaboration environment in response to trigger events occurring within the collaboration environment, and vice versa. The automated actions and/or trigger events may be user specified.

One or more implementations of a system configured to effectuate sets of automated actions outside a collaboration environment based on trigger events occurring within the collaboration environment may include one or more hardware processors configured by machine-readable instructions. The processor(s) may be configured to manage environment state information maintaining a collaboration environment. Managing may include one or more of obtaining, sending, receiving, storing, updating, deleting, archiving, reporting, and/or other processes. The collaboration environment may be configured to facilitate interaction by users with the collaboration environment. The environment state information may specify values of environment parameters and/or other information. The environment parameters may include one or more of user parameters, work unit parameters, and/or other parameters. The values of the user parameters may describe one or more of the users, user actions of the users within the collaboration environment, user settings of the users, and/or other information about the users. The values of work unit parameters may describe units of work managed, created, and/or assigned within the collaboration environment, and/or other information about units of work.

The processor(s) may be configured to generate automation information and/or other information. The automation information may be generated based on user entry and/or selection of the automation information into a user interface. The automation information may specify sets of automated actions to carry out outside of the collaboration environment in response to occurrence of trigger events within the collaboration environment. The user entry and/or selection of the automation information may include entry and/or selection of one or more of individual automated actions in individual sets of automated actions, individual trigger events, and/or other information. By way of non-limiting illustration, the automation information may specify a first set of automated actions to carry out outside of the collaboration environment in response to a first trigger event occurring within the collaboration environment.

The processor(s) may be configured to detect occurrence of the trigger events within the collaboration environment. The occurrence of the trigger events may be based on changes in the values of the environment parameters and/or other events occurring within the collaboration environment. By way of non-limiting illustration, an occurrence of the first trigger event may be detected based on a first change in a first value of a first environment parameter to a second value. In some implementations, the first trigger event may be associated with the first change (e.g., a state change of the first environment parameter). In some implementations, the first trigger event may be associated with the second value (e.g., a data change of the first environment parameter).

The processor(s) may be configured to effectuate individual sets of automated actions outside the collaboration environment. The effectuation of the individual sets of automated actions may be responsive to the detection of the occurrence of individual trigger events. By way of non-limiting illustration, responsive to the detection of the first trigger event, the first set of automated actions may be effectuated outside the collaboration environment.

One or more implementations of the system effectuate sets of automated actions within a collaboration environment based on trigger events occurring outside the collaboration environment may include one or more hardware processors configured by machine-readable instructions.

The processor(s) may be configured to manage environment state information maintaining a collaboration environment. The collaboration environment may be configured to facilitate interaction by users within the collaboration environment. The environment state information may specify values of environment parameters and/or other information. The environment parameters may include one or more of user parameters, work unit parameters, and/or other parameters. The values of the user parameters may describe one or more of the users, user actions of the users within the collaboration environment, user settings of the users, and/or other information about the users. The values of work unit parameters may describe units of work managed, created, and/or assigned within the collaboration environment, and/or other information about units of work.

The processor(s) may be configured to generate automation information and/or other information. The automation information may be generated based on user entry and/or selection of the automation information into a user interface. The automation information may specify sets of automated actions to carry out within the collaboration environment in response to occurrence of trigger events outside the collaboration environment. The user entry and/or selection of the automation information may include entry and/or selection of one or more of individual automated actions in individual sets of automated actions, individual trigger events, and/or other information. By way of non-limiting illustration, the automation information may specify a first set of automated actions to carry out within the collaboration environment in response to a first trigger event occurring outside the collaboration environment.

The processor(s) may be configured to obtain information indicating occurrence of the trigger events outside the collaboration environment. By way of non-limiting illustration, first information may be obtaining indicating an occurrence of the first trigger event outside the collaboration environment.

The processor(s) may be configured to effectuate individual sets of automated actions within the collaboration environment. The effectuation of the individual sets of automated actions may be responsive to obtaining the information indicating the occurrence of the trigger events outside the collaboration environment. By way of non-limiting illustration, responsive to obtaining the information indicating the occurrence of the first trigger event outside the collaboration environment, the processor(s) may be configured to effectuate the first set of automated actions within the collaboration environment.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
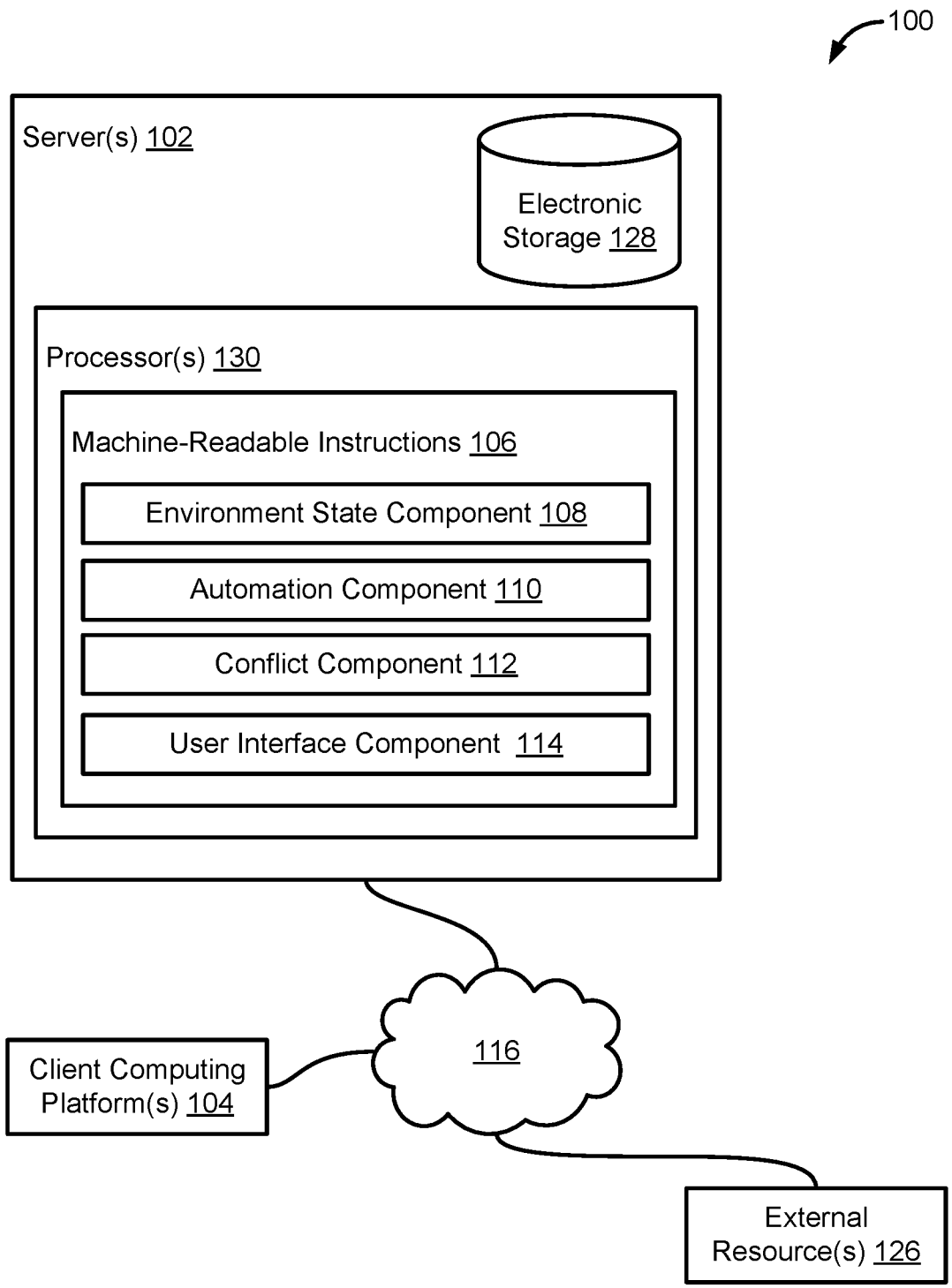
FIG. 1 illustrates a system configured to effectuate sets of automated actions outside and/or within a collaboration environment based on trigger events occurring outside and/or within the collaboration environment, in accordance with one or more implementations.

FIG. 1 illustrates a system 100 configured to effectuate sets of automated actions within and/or outside a collaboration environment based on trigger events occurring within and/or outside the collaboration environment, in accordance with one or more implementations. In some implementations, system 100 may be configured to effectuate sets of automated actions outside a collaboration environment based on trigger events occurring within the collaboration environment. In some implementations, system 100 may be configured to effectuate sets of automated actions within a collaboration environment based on trigger events occurring outside the collaboration environment.

One or more implementations of the systems and methods presented herein may create less friction and/or more efficient use of the collaboration environment and/or other applications/services by users by effectuating automatic sequences of actions in response to trigger events. The actions and/or triggers may be user specified. In some implementations, automated actions may be carried out outside the collaboration environment in response to trigger events within the collaboration environment. In some implementations, automated actions may be carried out within the collaboration environment in response to trigger events occurring outside the collaboration environment. In some implementations, automated actions may be carried out outside the collaboration environment in response to trigger events occurring outside the collaboration environment. Individual external resources of one or more external resources 126 may be sources of triggers and/or targets of automated actions. In some implementations, system 100 may be configured to communicate with one or more external resources 126 such that individual external resources may communicate reports indicating the occurrence of trigger events by the individual external resources.

In some implementations, system 100 may include one or more of one or more servers 102, one or more client computing platforms 104, one or more external resources 126, and/or other components. Server(s) 102 may be configured to communicate with one or more client computing platforms 104 and/or one or more external resources 126 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

In some implementations, individual external resources of one or more external resources 126 may include individual applications providing one or more services outside of system 100. An application may include one or more of a calendar application, a payment application, an electronic communication application, a social media application, restaurant-reservation application, on-demand delivery application, a project management application, a customer relationship management application, a ticketing application, a partner relationship management application, a web form application, and/or other applications outside of the system providing one or more services. It is noted that this list of applications providing one or more services outside of system 100 is provided for illustrative purposes only and not to be considered limiting. Instead, it is to be understood that other applications providing one or more services outside of system 100 may be considered which are within the scope of the present disclosure. In some implementations, external resources and/or other considerations of applications providing one or more services outside of system 100 may be considered as such by virtue of otherwise being unaffiliated with system 100. In some implementations, external resources and/or other considerations of applications providing one or more services outside of system 100 may be considered as such by virtue of utilizing other servers, processors, and/or other components which may be separate and distinct from system 100. In some implementations, external resources and/or other considerations of applications providing one or more services outside of system 100 may be considered as such by virtue of being created and/or administered by entities that may be separate and distinct from creators and/or administers of system 100.

A calendar application may comprise a software application configured to provide users with an electronic version of a calendar. The calendar application may provide an appointment book, address book, contact list, and/or other features and/or functionality. In some implementations, a calendar application may provide functionality of setting calendar events, setting reminders, and/or other functionality.

A payment application may comprise an e-commerce payment application, electronic payment application, peer-to-peer payments application, an electronic wallet application, and/or other applications that facilitate the sending and/or receiving of electronic payments and/or other online transactions.

An electronic communication application may comprise an application for providing electronic communication services. Electronic communication services may include one or more of electronic mail, instant messaging, private messaging, and/or other communications. An electronic communication application may provide functionality of one or more of compiling, sending, receiving, archiving, deleting, and/or performing other actions with respect to electronic communications.

A social media application may comprise an application configured to facilitate the creation and/or sharing of information via virtual communities and/or networks. A social media application may provide functionality of compiling, posting, reviewing, deleting, searching, and/or performing other actions with respect to information created and/or shared via virtual communities and/or networks.

A restaurant-reservation application may include an application configured to set and/or request reservations and restaurants in response to web-based requests for reservations. The restaurant-reservation application may be specific to a given restaurant and/or an application that services many restaurants. A restaurant-reservation application may provide the functionality of searching restaurants, searching availability of reservations, communicating with restaurants, setting reservations, sending confirmations, and/or other features and/or functionality.

An on-demand delivery application may comprise an application configured to effectuate real-world deliveries of real-world goods and/or services in response to web-based requests for those goods and/or services. The on-demand delivery application may be associated with what may commonly be referred to as a "gig economy" application. By way of non-limiting illustration, an on-demand delivery application may be directed to food delivery, consumer items, and/or other goods and/or services.

A project management application may comprise an application configured to facilitate planning, organizing, and/or otherwise managing resources. A project management application may provide functionality of estimation and planning, scheduling, cost control and budget management, resource allocation, communication, decision-making, quality management, time management and documentation, administration systems, and/or other functionality.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate effectuating sets of automated actions outside a collaboration environment based on trigger events occurring within the collaboration environment and/or effectuating sets of automated actions within a collaboration environment based on trigger events occurring outside the collaboration environment. The instruction components may include one or more of an environment state component 108, an automation component 110, a conflict component 112, a user interface component 114, and/or other instruction components.

Environment state component 108 may be configured to manage environment state information and/or other information used in maintaining a collaboration environment. The environment state information may include values of one or more environment parameters. The environment parameters may include one or more of user parameters, work unit parameters, and/or other parameters. The values of the user parameters may specify user information and/or other information. The values of the work unit parameters may specify work information and/or other information.

The values of the user parameters may be organized in user records corresponding to users interacting with and/or viewing the collaboration environment. The values of the user parameters associated with the users interacting with and/or viewing the collaboration environment may include information describing the users, user actions of the users within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The values of the user parameters may, by way of non-limiting example, specify one or more of: a user name, a group parameter, a user account, a user role, a user department, descriptive user content, a to-email, a from-email, a photo, an organization, a workspace, one or more projects (which may include project parameters defined by one or more work unit records), one or more portfolios of projects, one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more work units the user is associated with (units of work assigned to the user, assigned to other users by the user, completed by the user, past-due date, and/or other information), application access information (e.g., username/password for one or more third-party applications), one or more favorites and/or priorities, one or more values of one or more workload parameters (e.g., one or more measures of current and future workload associated with units of work assigned to a user), and/or other information for the given user.

The values of the work unit parameters may be organized in work unit records corresponding to units of work managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given unit of work may include one or more of a project, a task, a sub-task, a conversation (e.g., a message posting within a message board and/or other considerations), and/or other unit of work assigned to and/or associated with one or more users. In some implementations, users may be identified based on one or more of specific user identification (e.g., by name, username, and/or other information), descriptive user information (e.g., role, department, availability, and/or other information), and/or other considerations.

By way of non-limiting illustration, the one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, the units of work may be described based on one or more of a unit of work name, a unit of work description, one or more unit of work dates (e.g., a start date, a due date, a completion date, and/or dates), one or more members associated with a unit of work (e.g., an owner, one or more other project/task members, member access information, and/or other unit of work members and/or member information), a status parameter (e.g., an update, a hardcoded status update, a completed/uncomplete/mark complete, a measured status, a progress indication, quantity of sub-work units remaining for a given unit of work, completed work units in a given project, and/or other status parameter), one or more user comment parameters (e.g., permission for who may comments such as a creator, a recipient, one or more followers, and/or one or more other interested parties; content of the comments; one or more times; presence or absence of the functionality of up-votes; one or more hard-coded responses; and/or other parameters.), one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), and/or other values of work unit parameters.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, user actions within the collaboration environment may include effectuating one or more changes in one or more values of one or more of the environment parameters. User actions may be facilitated through a user interface presenting the collaboration environment. By way of non-limiting illustration, a user action may include marking a unit of work "complete." Marking a unit of work complete may change a value of a work unit parameter for the unit of work from "incomplete" to "marked complete." User actions may include other changes to other values of other environment parameters described herein.

The automation component 110 may be configured to generate automation information and/or other information. The automation information may be generated based on user entry and/or selection of the automation information into a user interface (see, e.g., user interface component 114, FIG. 4, and/or FIG. 5). In some implementations, automation information may specify sets of automated actions to carry out outside the collaboration environment in response to occurrence of trigger events within the collaboration environment. In some implementations, automation information may specify sets of automated actions to carry out within the collaboration environment in response to occurrence of trigger events outside the collaboration environment. In some implementations, automation information may specify sets of automated actions to carry out outside the collaboration environment in response to occurrence of trigger events outside the collaboration environment.

The user entry and/or selection of the automation information may include entry and/or selection of one or more of individual automated actions in individual sets of automated actions, individual trigger events, and/or other information. By way of non-limiting illustration, the automation information may specify a first set of automated actions to carry out in response to a first trigger event. The first set of automated actions and/or the first trigger event may be generated based on input by a first user into a user interface. The first set of automated actions may include one or more automated actions to carry out outside the collaboration environment. The first trigger event may include an event occurring within the collaboration environment. By way of non-limiting illustration, the automation information may specify a second set of automated actions to carry out in response to a second trigger event. The second set of automated actions and/or the second trigger event may be generated based on input by a first user into a user interface. The second set of automated actions may include one or more automated actions to carry out within the collaboration environment. The second trigger event may include an event occurring outside the collaboration environment.

The automation component 110 may be configured to detect occurrence of the trigger events within the collaboration environment based on changes in the values of the environment parameters and/or other information. Detection may be based on monitoring environment state information, user actions, and/or other components of system 100. By way of non-limiting illustration, an occurrence of the first trigger event may be detected based on a first change in a first value of a first environment parameter to a second value.

The automation component 110 may be configured to obtain information indicating occurrence of trigger events outside the collaboration environment. In some implementations, information indicating occurrence of trigger events outside the collaboration environment may be obtained by virtue of individual external resources communicating the information to system 100. The communicated information may include status reports and/or other information. In some implementations, the communication of the information may be based on automation component 110 sending requests for the information. In some implementations, the communication of the information may be based on individual external resources performing scheduled and/or predetermined reporting protocols (e.g., push notifications and/or other protocols). By way of non-limiting illustration, automation component 110 may be configured to obtain first information indicating an occurrence the second trigger event outside the collaboration environment.

In some implementations, an individual automated action within the collaboration environment may include effectuating one or more of creation of, change in, and/or specification of, one or more values of one or more of the environment parameters. In some implementations, the creation of, change in, and/or specification of values of environment parameters may be accomplished by accessing a corresponding record (e.g., user record, work unit record, and/or other records). In some implementations, creation of, change in, and/or specification of an individual value may be reflected in views of the collaboration environment accessed by users.

In some implementations, individual automated actions within the collaboration environment may be classified by individual action types. An action type may dictate the extent in which an automation action effects the collaboration environment. An action type may include one or more of a record creation type, value specification type, and/or other types. A record creation type automated action may include creating one or more of a user record, work unit record, and/or other records. The creation of a record may include generating an instance of the record in the collaboration environment. The creation of the record by a record creation type automated action may not specifically define values of the environment parameters within the record and/or may set values to one or more of default values, null values, and/or other values. A value specification type automated action may include changing, and/or specifying, one or more values of one or more of the environment parameters contained within a record.

In some implementations, value specification type automated action may further be classified by one or more action subtypes based on the individual values of the individual environment parameters associated with the individual automated actions. An action subtype may include one or more of a time-based subtype, privacy and/or permissions subtype, accessibility subtype, interaction subtype, and/or other subtype.

An automated action of the time-based subtype may effectuate change in, and/or specification of, one or more values of one or more of the environment parameters related to time. For a work unit record, this may include one or more unit of work dates (e.g., a start date, a due date, a completion date, and/or dates). For a user record, this may include one or more of a start of employment date, an end of employment date, a length of employment period, a length of vacation period, and/or other information.

An automated action of the privacy and/or permissions subtype may correspond to values of environment parameters related to privacy and/or permissions. By way of non-limiting illustration, an automated action performed on a user record being of the privacy and/or permissions subtype may include change of, and/or specification of, one or more of one or more teams a user belongs to, one or more user display settings (e.g., colors, size, project order, task order, other unit of work order, etc.), one or more authorized applications, application access information (e.g., username/ password for one or more third-party applications), one or more favorites and/or priorities, and/or other information for the user. By way of non-limiting illustration, an automated action performed on a work unit record being of the privacy and/or permissions subtype may include change of, and/or specification of, one or more of one or more user comment parameters (e.g., permission for who may comments such as a creator, a recipient, one or more followers, and/or one or more other interested parties; content of the comments; one or more times; presence or absence of the functionality of up-votes; one or more hard-coded responses; and/or other parameters.), notification settings, privacy settings, dependencies between one or more work units, and/or other values.

An automated action of the accessibility subtype may correspond to values of environment parameters which may be required in a record (user and/or work unit) in order for the record to take effect within the collaboration environment. Values of environment parameters which may be required in a record in order for the record to take effect may refer to values that, if left undefined, would not provide any meaningful use within the collaboration environment. In other words, the values of environment parameters which may be required in a record in order for the record to take effect may refer to a minimum quantity of environment parameters which may need to be specified in order to allow users to interact with and/or access the record. By way of non-limiting illustration, an automated action performed on a user record being of the accessibility subtype may include change of, and/or specification of, one or more of a user name, a user account, a user role, a user department, descriptive user content, a to-email, a from-email, a photo, an organization, and/or other values. By way of non-limiting illustration, an automated action performed on a work unit record being of the accessibility subtype may include change of, and/or specification of, one or more of a unit of work description, one or more members associated with a unit of work (e.g., an owner, one or more other project/task members, member access information, one or more assignees, and/or other information), an associated URL, and/or other values.

An automated action of the interaction subtype may correspond to values of environment parameters which may be specified in a record (user and/or work unit) in order to provide further functionality and/or accessibility within the collaboration environment. Values of environment parameters which may be specified in a record (user and/or work unit) in order to provide further functionality and/or accessibility may refer to values other than those associated with the time-based subtype, privacy and/or permissions subtype, accessibility subtype, and/or other subtypes.

It is noted that the classification of automated actions into action types and/or subtypes, and/or the descriptions of the different actions types and/or subtypes are provided for illustrative purposes only. Instead, it is to be understood that action types and/or subtype may be described in other ways, and/or automated actions may be classified in other ways.

In some implementations, an individual automated action may be carried out simultaneously (or near simultaneously) with an individual detection of an individual occurrence of an individual trigger event and/or within a specified time frame following an individual detection of an individual occurrence of an individual trigger event. In some implementations, a specified time frame may include a "waiting" period of time before an action is carried out. In some implementations, the waiting period of time may be satisfied by one or more of the passage of the period of time, some other trigger event, and/or other events and/or actions within the collaboration environment.

In some implementations, individual trigger events may be specified as individual occurrences of change of the values of the environment parameters. Occurrences of change may convey a state change of an environment parameter. The state change may not consider what the change is, but instead that a change occurred. For example, a trigger event may include an occurrence of a reassignment of a unit of work from one user to an other user. By way of non-limiting illustration, the first trigger event may be associated with the first change.

In some implementations, individual trigger events may be specified as individual values of the environment parameters. Changes to specific values may be referred to as data state changes. The data state change may refer to a change of a parameter to a specific value from an other value (and/or from a state of being unspecified). For example, a trigger event may include an occurrence of a reassignment of a unit of work from one user to another specific user. For example, a trigger event may include a comment having one or more specific words and/or phrases. By way of non-limiting illustration, the first trigger event may be associated with the second value and/or other values.

In some implementations, a set of automated actions may be associated with one or more of a sequence in which automated actions in the set are to be carried out, concurrent carrying out of two or more of the automated actions in the set, and/or other features and/or functionality. The automated actions within a set of automated actions may have a specified ordered sequence in which the automated actions are to be carried out. In some implementations, one or more actions may be followed by, and/or preceded by, a specified waiting period. A set of automation actions may specify that two or more actions may be carried out concurrently. In some implementations, a user may specify a combination and/or sequence of multiple triggers and/or multiple automated actions as a multi-step "workflow" that may include branching logic. By way of non-limiting illustration, a chain of trigger/action pairs of a given sequence may result in facilitating a workflow.

The automation component 110 may be configured to, responsive to the detection of the occurrence of individual trigger events, effectuate individual sets of automated actions outside the collaboration environment. By way of non-limiting illustration, responsive to the detection of the first trigger event, automation component 110 may be configured to effectuate the first set of automated actions outside the collaboration environment.

In some implementations, effectuating individual sets of automated actions outside the collaboration environment may include communicating instructions to effectuate the action to an external resource outside the collaboration environment. In some implementations, effectuating individual sets of automated actions outside the collaboration environment may include performing an application programming interface (API) call and/or other interaction with the external resource to cause the external resource to execute one or more routines in accordance with the instructions. An API interaction may include one or more Remote Procedure Call, Representational State Transfer, GraphQL, and/or other interaction.

The automation component 110 may be configured to, responsive to obtaining the information indicating the occurrence of the trigger events outside the collaboration environment, effectuate individual sets of automated actions within the collaboration environment. By way of non-limiting illustration, responsive to obtaining the first information indicating occurrence of the second trigger event, automation component 110 may be configured to effectuate the second set of automated actions within the collaboration environment.

In some implementations, individual sets of automated actions and associated individual trigger events may be stored in individual automation records. An automation record may define one or more of individual actions, individual trigger events, and/or other information. Individual actions may be defined by a target component, an action component, and/or other information. The target component of an automation record may include the environment parameter (or parameters) to which an action is to be carried out on and/or an external resource to which the action is to be carried out with. The action component of an automation record may define what change is to be made on the environment parameter(s) and/or instructions to effectuate the action by the external resource defined by the target component.

Individual trigger events may be defined by a source component, an event component, and/or other information. The source component of an automation record may include the environment parameter(s) and/or external resource(s) from which occurrences of a trigger event may be derived. The event component may include the value (or change in the value) for the environment parameter(s) and/or the information indicating occurrence of an event within the external resource defined by the source component from which occurrences of a trigger event may be derived.

In some implementations, individual automation records may store counts of occurrences of individual trigger events and/or occurrences of carrying out individual automation actions in the sets of automation actions.

It is noted that while some descriptions presented herein may be directed to an individual trigger event causing an individual set of automated actions to be carried out, this is for illustrative purposes only and not to be considered limiting. For example, in some implementations, multiple trigger events may be combined together through some logic criteria, that when satisfied, may cause an individual set of automated actions to be carried out within and/or outside the collaboration environment. Logic may include, for example, Boolean logic. By way of non-limiting illustration, logic operators such as "AND", "OR", "NOT", and/or other operations may be utilized to generate more complex trigger combinations for sets of automated actions. In some implementations, the use of logic operators may allow for fewer discrete trigger events to be defined yet still have more complex behavior available to users. For example, there may not need to specify a trigger event of "when task is unassigned", since through the use of a logic operator "NOT", a trigger event may be defined by "when task assigned" combined with the operator "NOT". Further, the Boolean logic may facilitate multistage automation. By way of non-limiting illustration, instead of input "than-if-then" or "if-and-if-then", logic may include "if-then-then" and/or other operators. In some implementations, a user may specify a set, or pool, of trigger events to trigger one or more automated actions. In some implementations, user may specify that one or more of the trigger events in the set may individually and/or in combination trigger the one or more automated actions. This way, a user may specify multiple options of trigger events which may trigger one or more automated actions. Further, an individual trigger event may trigger multiple automated actions.

The automation component 110 may be configured to determine individual sets of repeated user actions by the individual users. The determination may be based on monitoring environment state information (e.g., change in values of environment parameters and/or other monitoring), user actions, information indicating occurrence of the trigger events outside the collaboration environment, and/or other information generated by and/or accessible to system 100. In some implementations, determining individual sets of repeated user actions by the individual users may include determining one or more actions and/or events occurring within and/or outside the collaboration environment which precede the individual sets of repeated user actions. In some implementations, a set of user actions may be deemed "repeated" after the set of user actions occur more than once.

The automation component 110 may be configured to generate recommendations for automation information based on individual sets of repeated user actions and/or other information. The recommendations may include individual recommended sets of automated actions and/or individual recommended trigger events which correspond to the individual sets of repeated user actions. In some implementations, recommended trigger events may include the actions and/or events occurring within and/or outside the collaboration environment which precede the individual sets of repeated user actions. In some implementations, individual recommended sets of automated actions may include the individual sets of repeated user actions. In some implementations, a recommendation may include a notification (e.g., pop-up message, email, and/or other notification) describing one or more of the individual sets of repeated user actions, the individual recommended sets of automated actions, the individual recommended trigger events, and/or other information. By way of non-limiting illustration, a set of repeated user actions for a given user may include generating a specific task, assigning the specific task to a specific person (or persons), adding a comment to the task, causing an external application of an external resource to perform some action, and/or other actions. The automation component 110 may determine that the set of repeated user actions for the given user is preceded by an other specific task being marked completed. The automation component 100 may be configured to generate a recommendation for automation information including a set of recommended automated actions including generating the specific task, assigning the specific task to the specific person (or persons), adding a comment to the task, generating and/or sending instructions to effectuate the action by the external application, and/or other actions. The automation component 110 may be configured such that the recommendation includes a recommended trigger event including the other specific task being "marked complete."

In some implementations, automation component 110 may be configured to obtain and/or generate one or more automation templates. An automation template may specify a predetermined set of automated actions to carry out in and/or outside the collaboration environment in response to occurrence of a predetermined trigger event. The one or more automation templates may be stored by electronic storage 128 and/or other storage device. In some implementations, an automation template may represent sets of actions users may commonly carry out in response to an action and/or occurrence within and/or outside the collaboration environment. In some implementations, automation templates may be created by system administrators, other users, based on repeated user actions, and/or created in other ways. In some implementations, the automation templates may be stored in a library for access and/or implementation by individual users.

The conflict component 112 may be configured to analyze automation information to identify conflicts within the sets of automated actions and/or the trigger events. In some implementations, analyzing automation information may include simulating execution of the automation information in a testing environment to determine a potential outcome of the automation information. In some implementations, conflicts may include one or more of repeating and/or ongoing automated actions (e.g., where a set of automated actions may not have a finite end), an instance when an individual automated action comprises an individual trigger event (e.g., resulting in a looping of trigger-action-trigger-action, etc.), and/or other conflicts.

In some implementations, analyzing automation information may further include only allowing the execution of automated actions after a triggering event if the state specified in the actions are not already true. If they are already true, conflict component 112 may recognize this as a conflict and not execute the action(s) again.

In some implementations, a user may use a user interface to construct and manipulate a representation of an automation record, rather than editing information within the automation record itself. This may allow conflict component 112 to prevent conflicts in the execution of the automation records being edited in the "live" versions of the automated records. Further, conflict component 112 may validate the representations and prevent configuration errors before saving them to the system 100.

In some implementations, conflict component 112 may be configured to analyze automation information as a user is specifying the automation information within a user interface (see, e.g., user interface component 114) and/or after the automation information has been specified and saved. The user interface may be configured to present errors at a number of possible failure points as the user is interacting with the user interface in real-time and/or near-real time. The possible failure points may include one or more of configuration failures, run time failures, cadence failures, container failures, editing failures, invalid permissions to an external resource, and/or other information.

The configuration failures may be related to if a user constructs a representation of an automation record that contains some sort of conflict and/or is invalid, conflict component 112 may validate that representation before saving or executing it, and notify the user contextually about the fixes that should be made in order to save and enable the automation record.

The run time failures may be related to determining that an automation record may be misconfigured when it attempts to execute the record. The conflict component 112 may send notifications (e.g., email, on-screen notifications, and/or other notification) containing information about the configuration error, and/or how to resolve it. A similar notification may also be sent by conflict component 112 if the execution fails due to some sort of system issue. In this case, the user may be notified that they do not need to take any action to resolve this failure.

The cadence failures may be related to when a trigger event may be misconfigured, the associated set of automated actions would never be executed because the trigger event may never be activated. To prevent this silent failure, the conflict component 112 may be configured to run checks on a regular cadence of the automation records within the system 100. This cadence check may iterate through the triggers and/or actions on individual automation records, and notify an appropriate user.

The container failures may be related to when a user visits a container object (e.g., project, portfolio, etc.). The conflict component 112 may present the user with pertinent status information about automation records associated with the container object, allowing them to fix any problems that may have arisen even without having seen any of the relevant notifications in other areas.

The editing failures may be related to editing an automation record with invalid components. A user may be directed through the user interface towards the specific components and/or associated inputs that may be causing an automation record to be invalid. This guided process may allow users to easily address and fix those issues so an automation record may resume operation.

The conflict component 112 may be configured to generate conflict reports based on the analysis. In some implementations, a conflict report may include a description of one or more conflicts and/or an indication of nonexistence of conflicts. In some implementations, a conflict report may provide an indication of elements of an automated action and/or trigger event which may comprise a source of conflict.

In some implementations, conflict component 112 may be configured to rate limit automated actions of one or more automation records. Rate limiting may include canceling and/or throttling execution of one or more automated actions based on one or more conditions. By way of non-limiting illustration, if one or more automated actions are triggered to execute more than X times in Y seconds, conflict component 112 may be configured to cancel one or more executions in that Y-second window. The values of X and/or Y may be user specified and/or specified by the system 100. In some implementations, if one or more automated actions at a project level are executed more than A times in B seconds, conflict component 112 may be configured to cancel one or more executions in that B-second window. The values of A and/or B may be user specified and/or specified by the system 100.

User interface component 114 may be configured to effectuate presentation of individual user interfaces on individual client computing platforms of one or more client computing platforms 104. For example, the individual client computing platforms may access a user interface over network 116. A given user interface may be configured to facilitate user specification of sets of automated actions and/or trigger events. In some implementations, user interface component 114 may be configured to prevent presentation of individual user interfaces configured to facilitate user specification (and/or modification) of sets of automated actions and/or trigger events by users who may not be authorized within system 100.

The user interface component 114 may be configured to effectuate presentation of a user interface through which users may specify and/or select one or more of one or more automated actions, one or more trigger events, one or more automation templates, and/or other information. In some implementations, a user interface may display one or more conflict reports and/or other prompts and/or notifications to a user. In some implementations, users may provide entry and/or selection of a period of time or times when an automation record may be active (e.g., configured to be executed) and/or paused (e.g., configured to not be executed). By way of non-limiting illustration, a user interface element may comprise an "active/paused" toggle button.

The user interface may include one or more user interface portions. By way of non-limiting illustration, a user interface may include one or more input portions and/or other components. Individual portions may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction.

An input portion of a user interface may be configured to obtain user input comprising one or more of user entry and/or selection of environment parameters to carry out actions on, entry and/or selection of values to apply to the entered and/or selected environment parameters, entry and/or selection of environment parameters associated with trigger events, entry and/or selection of values of environment parameters associated with trigger events, user entry and/or selection of one or more automation templates, entry and/or selection of external resource(s) to carry out actions on, entry and/or selection of action(s) within selected external resource(s) to carry out, entry and/or selection of external resource(s) associated with trigger events, entry and/or selection of occurrence(s) within external resource(s) which may comprise trigger events, and/or other information. In some implementations, in response to entry and/or selection of an external resource (for either an action and/or trigger), the user interface may present a prompt confirming the use of the external resource. This may be a safeguard against inadvertently carrying out actions on items outside the collaboration environment. A user may confirm and/or deny the prompt, via, for example, selecting a virtual button and/or an authentication procedure.

Figure 4:
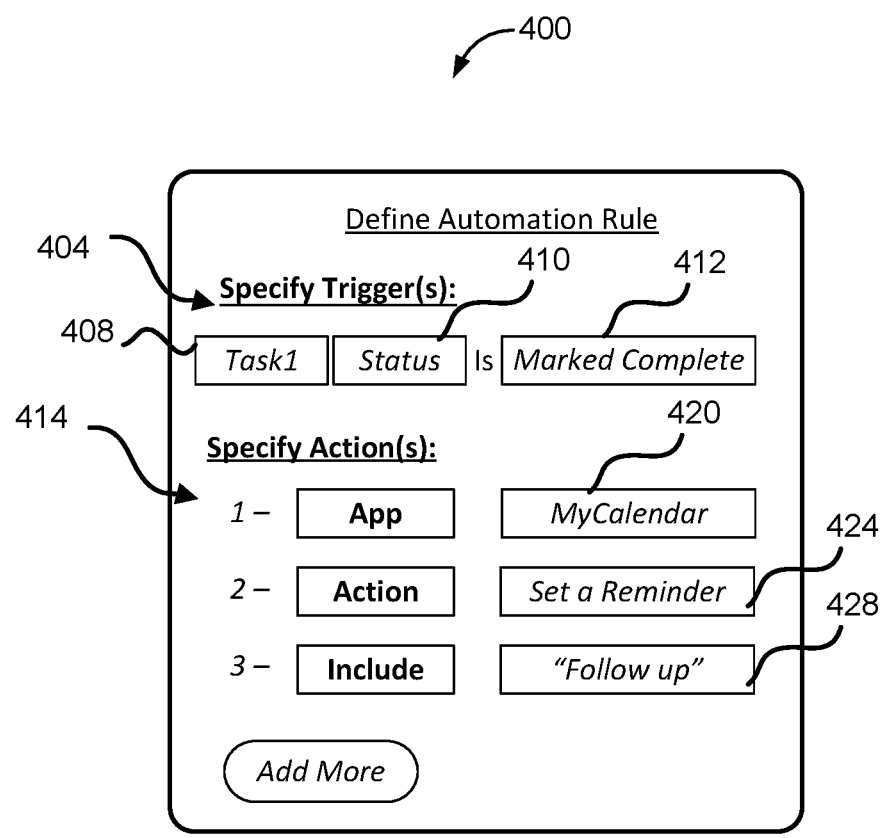
FIG. 4 illustrates an exemplary user interface, in accordance with one or more implementations.

FIG. 4 illustrates an exemplary user interface 400, in accordance with one or more implementations. The user interface 400 may be configured to obtain user entry and/or selection of automation information and/or other information. The user entry and/or selection may be in the form of specification of automated actions, trigger events, and/or other information.

In some implementations, automated actions may be specified based on entry and/or selection of one or more of individual external resources, individual actions for the individual external resources to carry out, and/or other information. In some implementations, trigger events may be specified based on one or more of entry and/or selection of environment parameters associated with trigger events, entry and/or selection of values of environment parameters associated with trigger events, and/or other information.

In some implementations, automated actions may be specified based on entry and/or selection of environment parameters to carry out actions on, entry and/or selection of values to apply to the entered and/or selected environment parameters, and/or other information. In some implementations, trigger events may be specified based on one or more of entry and/or selection one or more of individual external resources from which trigger events may be derived, individual actions by the individual external resources from which occurrence of the trigger events may be derived, and/or other information.

The user interface 400 may include a trigger input portion 404 to obtain entry and/or selection of a trigger event. The trigger input portion 404 may include a user interface element 408 configured to obtain information identifying a unit of work associated with the trigger event, a user interface element 410 configured to obtain entry and/or selection of an environment parameter associated with the trigger event, and a user interface element 412 configured to obtain entry and/or selection of a value for the environment parameter associated with the trigger event. For illustrative purposes, the trigger event in FIG. 4 may refer to the status of the task named "Task1" being "marked complete."

The user interface 400 may include an automated action input portion 414 to obtain entry and/or selection of a set of automated actions. The automated action input portion 414 may include a user interface element 420 configured to obtain entry and/or selection of an identification of an external resource (e.g., a name of an external application of the external resource). For illustrative purposes, the external resource may be identified as "MyCalendar" which may be an external calendar application.

The automated action input portion 414 may include user interface element 424 configured to obtain entry and/or selection of an action to carry out in the identified external resource. For illustrative purposes, the action to carry out may include "Set a reminder."

The automated action input portion 414 may include a user interface element 428 configured to obtain entry and/or selection of a further specification of the action to carry out in the identified external resource. For illustrative purposes, the further specification may include setting the content of the reminder to "Follow up."

It is noted that FIG. 4 is for illustrative purposes only and is not to be considered limiting. Instead, it is to be understood that the user interface 400 may be configured in other ways and/or including other elements in accordance with one or more implementations of the system 100 presented herein.

Figure 5:
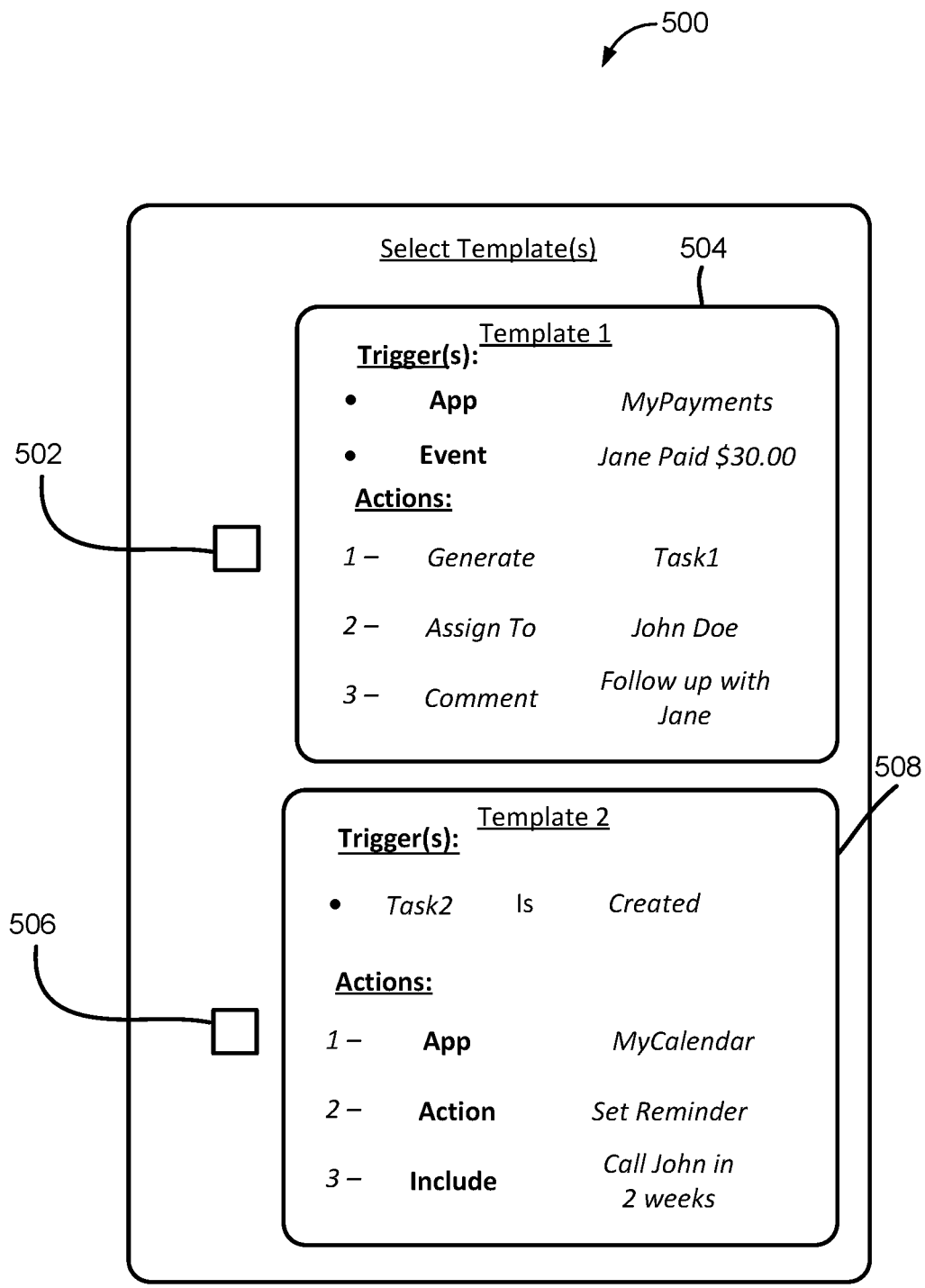
FIG. 5 illustrates an exemplary user interface, in accordance with one or more implementations.

FIG. 5 illustrates a user interface 500, in accordance with one or more implementations. The user interface 500 may include one or more user interface elements configured to facilitate user interaction with the user interface 500. The user interaction may include input to select one or more automation templates. By way of non-limiting illustration, the user interface 500 may include a first user interface element 502, a second user interface element 506, and/or other user interface elements. The first user interface element 502 may be selected to effectuate a first template 504. The second user interface element 506 may be selected to effectuate a second template 508.

It is noted that FIG. 5 is for illustrative purposes only and is not to be considered limiting. Instead, it is to be understood that the user interface 500 may be configured in other ways and/or including other elements in accordance with one or more implementations of the system 100 presented herein.

In FIG. 1, in some implementations, server(s) 102, client computing platform(s) 104, and/or external resource(s) 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connected to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor (s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
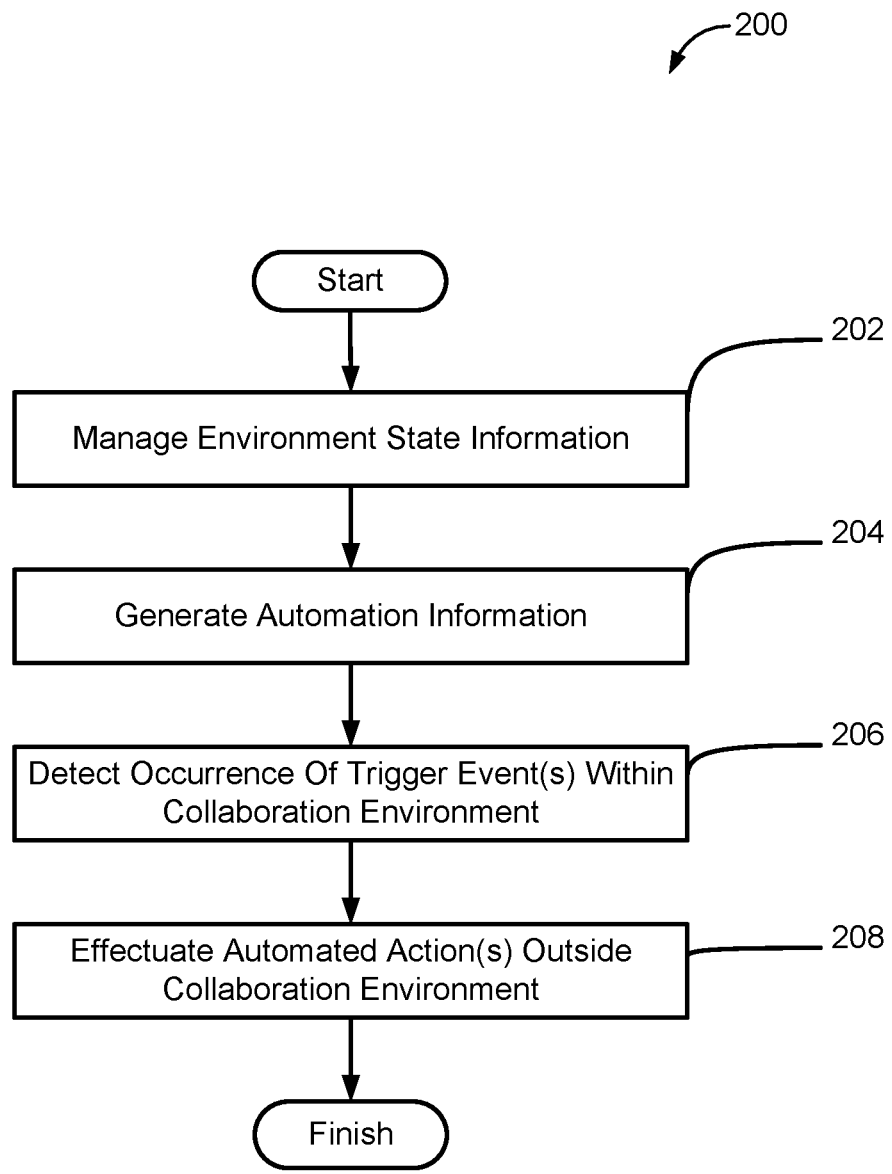
FIG. 2 illustrates a method to effectuate sets of automated actions outside a collaboration environment based on trigger events occurring within the collaboration environment, in accordance with one or more implementations.

FIG. 2 illustrates a method 200 to effectuate sets of automated actions outside a collaboration environment based on trigger events occurring within the collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may specify values of environment parameters and/or other information. The environment parameters may include one or more of user parameters, work unit parameters, and/or other parameters. The values of the user parameters may describe one or more of the users, user actions of the users within the collaboration environment, user settings of the users, and/or other information about the users. The values of work unit parameters may describe units of work managed, created, and/or assigned within the collaboration environment, and/or other information about units of work. Operation 202 may be performed by one or more hardware processors configured by machine-readable instructions including a component that is the same as or similar to environment state component 108, in accordance with one or more implementations.

An operation 204 may generate automation information and/or other information. The automation information may be generated based on user entry and/or selection of the automation information into a user interface. The automation information may specify sets of automated actions to carry out outside of the collaboration environment in response to occurrence of trigger events within the collaboration environment. The user entry and/or selection of the automation information may include entry and/or selection of one or more of individual automated actions in individual sets of automated actions, individual trigger events, and/or other information. By way of non-limiting illustration, the automation information may specify a first set of automated actions to carry out outside of the collaboration environment in response to a first trigger event occurring within the collaboration environment. The first set of automated actions and/or the first trigger event may be generated based on input by a first user into a user interface. Operation 204 may be performed by one or more hardware processors configured by machine-readable instructions including a component that is the same as or similar to automation component 110, in accordance with one or more implementations.

An operation 206 may detect occurrence of the trigger events within the collaboration. The occurrence of the trigger events within the collaboration may be based on changes in the values of the environment parameters and/or other events occurring within the collaboration environment. By way of non-limiting illustration, an occurrence of the first trigger event may be detected based on a first change in a first value of a first environment parameter to a second value. In some implementations, the first trigger event may be associated with the first change (e.g., a state change of the first environment parameter). In some implementations, the first trigger event may be associated with the second value (e.g., a data change of the first environment parameter). Operation 206 may be performed by one or more hardware processors configured by machine-readable instructions including a component that is the same as or similar to automation component 110, in accordance with one or more implementations.

An operation 208 may effectuate individual sets of automated actions outside the collaboration environment. The effectuation of the individual sets of automated actions outside the collaboration environment may be responsive to the detection of the occurrence of individual trigger events within the collaboration environment. By way of non-limiting illustration, responsive to the detection of the first trigger event, the first set of automated actions may be effectuated outside the collaboration environment. Operation 208 may be performed by one or more hardware processors configured by machine-readable instructions including a component that is the same as or similar to automation component 110, in accordance with one or more implementations.

Figure 3:
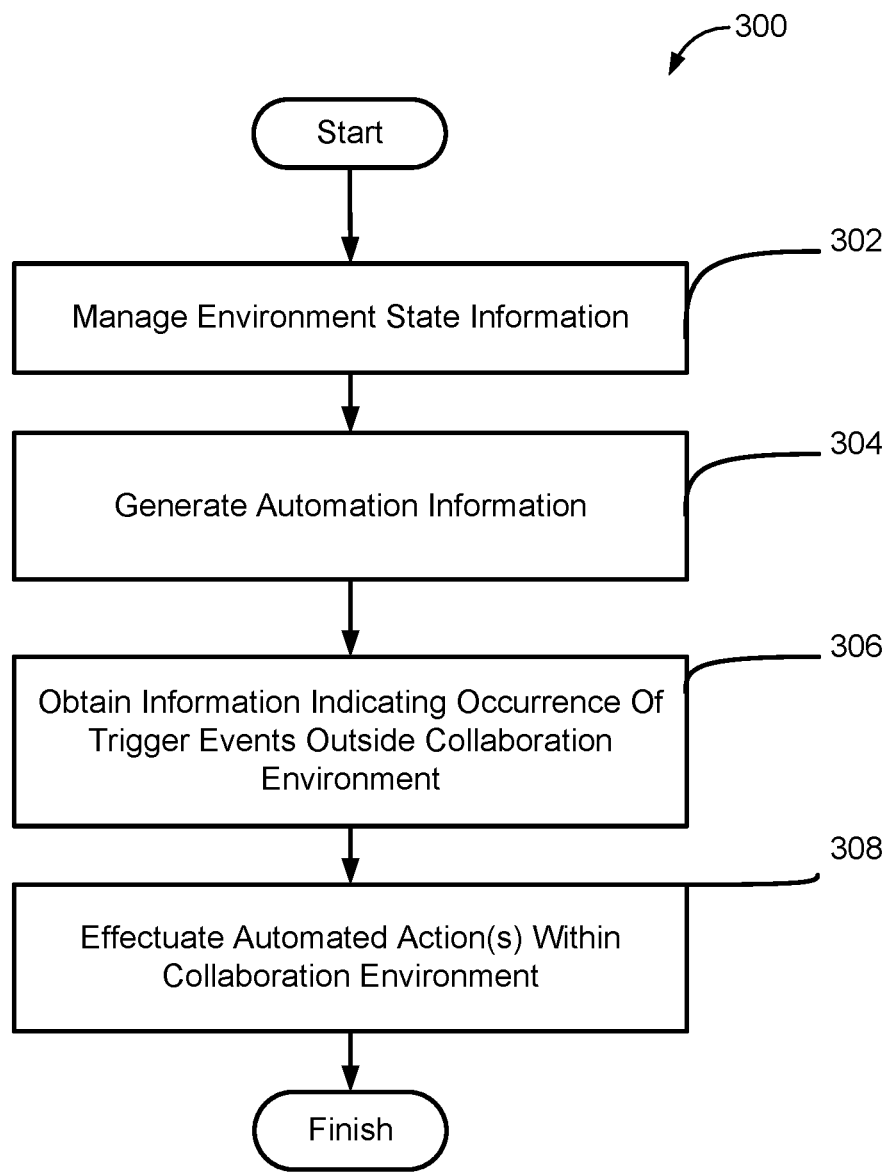
FIG. 3 illustrates a method to effectuate sets of automated actions within a collaboration environment based on trigger events occurring outside the collaboration environment, in accordance with one or more implementations.

FIG. 3 illustrates a method 300 to effectuate sets of automated actions within a collaboration environment based on trigger events occurring outside the collaboration environment, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may manage environment state information maintaining a collaboration environment. The collaboration environment may be configured to facilitate interaction by users with the collaboration environment. The environment state information may specify values of environment parameters and/or other information. The environment parameters may include one or more of user parameters, work unit parameters, and/or other parameters. The values of the user parameters may describe one or more of the users, user actions of the users within the collaboration environment, user settings of the users, and/or other information about the users. The values of work unit parameters may describe units of work managed, created, and/or assigned within the collaboration environment, and/or other information about units of work. Operation 302 may be performed by one or more hardware processors configured by machine-readable instructions including a component that is the same as or similar to environment state component 108, in accordance with one or more implementations.

An operation 304 may generate automation information and/or other information. The automation information may be generated based on user entry and/or selection of the automation information into a user interface. The automation information may specify sets of automated actions to carry out within of the collaboration environment in response to occurrence of trigger events outside the collaboration environment. The user entry and/or selection of the automation information may include entry and/or selection of one or more of individual automated actions in individual sets of automated actions, individual trigger events, and/or other information. By way of non-limiting illustration, the automation information may specify a first set of automated actions to carry out within of the collaboration environment in response to a first trigger event occurring outside the collaboration environment. The first set of automated actions and/or the first trigger event may be generated based on input by a first user into a user interface. Operation 304 may be performed by one or more hardware processors configured by machine-readable instructions including a component that is the same as or similar to automation component 110, in accordance with one or more implementations.

An operation 306 may obtain information indicating occurrence of the trigger events outside the collaboration environment. By way of non-limiting illustration, first information may be obtained. The first information may indicate an occurrence of the first trigger event outside the collaboration environment. Operation 306 may be performed by one or more hardware processors configured by machine-readable instructions including a component that is the same as or similar to automation component 110, in accordance with one or more implementations.

An operation 308 may effectuate individual sets of automated actions within the collaboration environment. The effectuation of the individual sets of automated actions outside the collaboration environment may be responsive to obtaining the information indicating the occurrence of the trigger events outside the collaboration environment. By way of non-limiting illustration, responsive to obtaining the information indicating the occurrence of the first trigger event outside the collaboration environment, the first set of automated actions may be effectuated within the collaboration environment. Operation 308 may be performed by one or more hardware processors configured by machine-readable instructions including a component that is the same as or similar to automation component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to effectuate sets of automated actions outside a collaboration environment based on trigger events occurring within the collaboration environment, the system comprising:
   one or more physical processors configured by machine-readable instructions to:
      manage environment state information maintaining a collaboration environment, the collaboration environment being configured to facilitate interaction by users with the collaboration environment, the environment state information including values of environment parameters, the environment parameters including user parameters and work unit parameters, the values of the user parameters describing one or more of the users, user actions of the users within the collaboration environment, or user settings of the users, the values of the work unit parameters describing units of work created and assigned within the collaboration environment, the units of work being described based on one or more actions that the users assigned to the units of work are expected to accomplish in order to mark the units of work as complete;
      generate automation information based on user entry or selection of the automation information into a user interface, the automation information specifying sets of automated actions to carry out by a payment application resource that is managed outside of the collaboration environment in response to occurrence of trigger events within the collaboration environment, the user entry or selection of the automation information including entry or selection of individual automated actions and individual trigger events, such that the automation information specifies a first set of automated actions to carry out by the payment application resource outside of the collaboration environment in response to a first trigger event occurring within the collaboration environment;
      detect the occurrence of the trigger events within the collaboration environment based on changes to the units of work, the changes including one or both of completion state changes or due date changes, such that an occurrence of the first trigger event is detected based on a first change to a first unit of work; and
      responsive to detection of the occurrence of the individual trigger events:
         establish a connection with the payment application resource that is managed outside of the collaboration environment; and
         cause the payment application resource to perform the sets of automated actions outside the collaboration environment, such that responsive to detection of the occurrence of the first trigger event, cause the payment application resource to perform the first set of automated actions outside the collaboration environment, the first set of automated actions performed by the payment application resource including sending one or more electronic payments.

2. The system of claim 1, wherein an automated action is defined by a target component and an action component, the target component identifying the payment application resource outside the collaboration environment to which an action is to be carried out with, and the action component defining instructions to effectuate the action by the payment application resource outside the collaboration environment.

3. The system of claim 2, wherein the instructions to effectuate the action by the payment application resource outside the collaboration environment includes performing an application programming interface call to the payment application resource to cause the payment application resource to execute a routine in accordance with the action.

4. The system of claim 1, wherein the one or more physical processors are further configured by the machine-readable instructions to:
   responsive to the detection of the occurrence of the individual trigger events:
      establish a connection with a social media application resource that is managed outside of the collaboration environment; and
      cause the social media application resource to perform the sets of automated actions outside the collaboration environment, such that responsive to detection of the occurrence of a second trigger event, cause the social media application resource to perform a second set of automated actions outside the collaboration environment, the second set of automated actions performed by the social media application resource including posting content within a social media platform.

5. The system of claim 1, wherein the individual trigger events are associated with individual occurrences of the changes to the units of work, such that the first trigger event is associated with an occurrence of the first change.

6. The system of claim 1, wherein the individual trigger events are associated with substance of the changes to the units of work, such that the first trigger event is associated with the substance of the first change.

7. The system of claim 1, wherein an individual automated action is carried out immediately or within a specified time frame following an individual detection of an individual occurrence of an individual trigger event.

8. The system of claim 1, further comprising non-transitory electronic storage storing one or more automation templates, an automation template specifying a predetermined set of automated actions to carry out outside the collaboration environment in response to occurrence of a predetermined trigger event occurring within the collaboration environment.

9. The system of claim 1, wherein the first change is a due date change.

10. The system of claim 1, wherein the first change is a completion state change.

11. A method to effectuate sets of automated actions outside a collaboration environment based on trigger events occurring within the collaboration environment, the method comprising:
managing environment state information maintaining a collaboration environment, the collaboration environment being configured to facilitate interaction by users with the collaboration environment, the environment state information including values of environment parameters, the environment parameters including user parameters and work unit parameters, the values of the user parameters describing one or more of the users, user actions of the users within the collaboration environment, or user settings of the users, the values of the work unit parameters describing units of work created and assigned within the collaboration environment, the units of work being described based on one or more actions that the users assigned to the units of work are expected to accomplish in order to mark the units of work as complete;
generating automation information based on user entry or selection of the automation information into a user interface, the automation information specifying sets of automated actions to carry out by a payment application resource that is managed outside of the collaboration environment in response to occurrence of trigger events within the collaboration environment, the user entry or selection of the automation information including entry or selection of individual automated actions and individual trigger events, the automation information specifying a first set of automated actions to carry out by the payment application resource outside of the collaboration environment in response to a first trigger event occurring within the collaboration environment;
detecting the occurrence of the trigger events within the collaboration environment based on changes to the units of work, the changes including one or both of completion state changes or due date changes, including detecting an occurrence of the first trigger event based on a first change to a first unit of work; and
responsive to detection of the occurrence of the individual trigger events:
establishing a connection with the payment application resource that is managed outside of the collaboration environment; and
causing the payment application resource to perform the sets of automated actions outside the collaboration environment, including responsive to detection of the occurrence of the first trigger event, causing the payment application resource to perform the first set of automated actions outside the collaboration environment, the first set of automated actions performed by the payment application resource including sending one or more electronic payments.

12. The method of claim 11, wherein an automated action is defined by a target component and an action component, the target component identifying the payment application resource outside the collaboration environment to which an action is to be carried out with, and the action component defining instructions to effectuate the action by the payment application resource outside the collaboration environment.

13. The method of claim 12, wherein the instructions to effectuate the action by the payment application resource outside the collaboration environment includes performing an application programming interface call to the payment application resource to cause the payment application resource to execute a routine in accordance with the action.

14. The method of claim 11, further comprising:
responsive to the detection of the occurrence of the individual trigger events:
establishing a connection with a social media application resource that is managed outside of the collaboration environment; and
causing the social media application resource to perform the sets of automated actions outside the collaboration environment, including responsive to detection of the occurrence of a second trigger event, causing the social media application resource to perform a second set of automated actions outside the collaboration environment, the second set of automated actions performed by the social media application resource including posting content within a social media platform.

15. The method of claim 11, wherein the individual trigger events are associated with individual occurrences of the changes to the units of work, such that the first trigger event is associated with an occurrence of the first change.

16. The method of claim 11, wherein the individual trigger events are associated with substance of the changes to the units of work, such that the first trigger event is associated with the substance of the first change.

17. The method of claim 11, wherein an individual automated action is carried out immediately or within a specified time frame following an individual detection of an individual occurrence of an individual trigger event.

18. The method of claim 11, further comprising storing one or more automation templates, an automation template specifying a predetermined set of automated actions to carry out outside the collaboration environment in response to occurrence of a predetermined trigger event occurring within the collaboration environment.

19. The method of claim 11, wherein the first change is a due date change.

20. The method of claim 11, wherein the first change is a completion state change.

* * * * *